United States Patent Office 3,567,791
Patented Mar. 2, 1971

3,567,791
EXTRACTION PROCESS
Everett J. Fuller, Gillette, N.J., assignor to Esso
Research and Engineering Company
No Drawing. Filed May 12, 1969, Ser. No. 823,958
Int. Cl. C07c 7/10
U.S. Cl. 260—674
18 Claims

ABSTRACT OF THE DISCLOSURE

A separation process in which aromatics are extracted from a feed stream by contacting said feed stream with a slurry. The slurry comprises a substance capable of forming an insoluble inclusion compound with the aromatic and a liquid solvent. The solvent has the capacity to solvent-extract the aromatics and to further permit the formation of separate liquid layers, one layer containing primarily feed stream depleted in aromatics, the other containing the solvent, enriched in aromatics and an insoluble inclusion compound.

BACKGROUND OF THE INVENTION

Field of the invention

This invention relates to an improved process for the removal of aromatics from a feed stream. More particularly, this invention relates to the removal of aromatics from petroleum fractions or hydrocarbon fractions boiling in the range of 120° to 1200° F.; this would include naphthas, and particularly steam cracked naphthas.

The removal of aromatics from these fractions is accomplished by contacting the feed stream with an inclusion forming substance, or host, which is capable of complexing with one or more constitutents, or guests within the feed mixture. In this case the guest is aromatic in nature. The inclusion forming substance is slurried within a liquid solvent, which solvent has the ability to extract aromatics from the feed stream.

Additionally, it is essential that the solvent be capable of permitting the formation, after complexation, of separate layers; one layer containing the feed stream depleted in aromatics, the other layer, a slurry of the solvent with a complex of aromatic and host compound. The solvent is, in addition, enriched in the aromatic constituents of the feed stream. One advantage of this process is that it may be conducted on a continuous basis by contacting the feed stream countercurrently with a slurry of solvent and inclusion forming substance.

Description of the prior art

The use of inclusion compound-forming substances such as Werner complexes for the preferential removal of various compounds from a mixture has been known for a considerable length of time. The historical development and chemical nature of such compounds is well documented in Mandelcorn, "Non-Stoichiometric Compounds," Academic Press, 1964. The use of the term "non-stoichiometric," as applied to complexes formed by the inclusion compounds, which complex comprises a host and a guest, is appropriate since X-ray data regarding such complexes reveal that the guest compound may be trapped in channels in the case of urea or cages in the case of clathrates, which are formed by the continuous crystal lattice of the host compound. Such compounds do not necessarily obey the law of simple multiple proportions; the molecular ratio of host to guest need nt be a whole number. The stability of the complex, then, may depend prmiarily upon a physical relationship or fit between the guest molecules and the channels of the host rather than on a chemical relationship between the guest molecule and the channel-forming compound.

Werner complexes have been used effectively to remove aromatics from admixture with other compounds; this is, of course, not to say that the only means for complexing aromatics are Werner compounds. Clathrates of aromatics with cyclodextrins, carbon tetrahalides, pyromellitic dianhydride, metal halides, desoxycholic acid, triphenylmethane, and tri-o-thymotide may perform the same function.

Werner complexes are discussed at length in British Pat. No. 1,055,815, assigned to the Union Oil Company and a publication, "Use of Werner Complexes for the Clathration-Separation of Organic Mixtures," W. D. Schaeffer et al., 6th World Petroleum Congress, Volume 4, pp. 65–73, both of which are herein incorporated by reference.

The Werner complexes useful in the process of this invention have the following characteristics:

(1) They are described by the formula $AB_xC_y$, where A is a metal ion, preferably of atomic number greater than 11; B is a basic nitrogen compound such as pyridine; C is an anion such as chloride; and $x$ and $y$ are integers from 1 to 6.

(2) They form solid derivatives with aromatic molecules.

(3) They are only slightly soluble in hydrocarbon solvents, i.e., less than 25% by weight of the saturated solution would consist of salt.

(4) They are moderately or very soluble in polar organic solvents such as ethers, alcohols, esters, ketones, etc., i.e., to 25 weight percent or more of the saturated solution.

A typical Werner complex, which is preferred, is nickel tetra-(4-methyl pyridine) dithiocyanate. This compound contains the two portions which typically make up the Werner complex. The Werner salt, which is the nickel thiocyanate, and the Werner amine, which is 4-methyl pyridine.

Typically, Werner complexes are used in batch operation; the disadvantages of this include the necessity of repeated process make-up, periodic adjustment of the system to optimize precipitation conditions, and discontinuous mass transport of solids and solutions. On a large scale, these difficulties severely limit the convenience and operability of a separation process. In addition, the Werner complex is inherently limited with respect to the amount of aromatic which it can remove from a mixture. Thus, large amounts of complex are needed to remove the aromatic constituents of a feed stream such as steam cracked naphtha.

SUMMARY OF THE INVENTION

In accordance with this invention, a process has been developed which may be used, on a continuous basis, to separate aromatics from hydrocarbon feed streams or fractions, said fractions boiling usually in the range of about 120° to 1200° F. This is accomplished by contacting, preferably countercurrently, within a suitable contacting device, a feed stream containing aromatics and a slurry comprising a substance capable of forming an inclusion compound with aromatics, such as one of the Werner complexes described herein, and a liquid solvent capable of extracting aromatics. The liquid solvent must be of such a nature as to promote the formation of separate layers after extraction and complexation have taken place. The top layer, or raffinate, comprises the feed stream depleted in aromatics. The bottom layer is a slurry of solid complex in a solution, said complex comprising aromatics adducted by a host compound, such as a Werner complex, and said solution comprising aromatic hydrocarbons extracted and dissolved in the solvent. Ambient pressures and temperatures may effectively be utilized during this countercurrent contacting. Following the countercurrent contacting, within a suitable contacting device such as a sieve tray tower or a packed tower, the slurry mixture obtained flows continuously from the system since it is readily pumpable; this represents a substantial improvement over the prior batch type operations.

The ability of the solvent to selectively extract aromatics is also enhanced for the following reason. At any point in the separation, when equilibrium has been reached, the solvent is saturated with respect to all components; i.e., it is a saturated solution containing both hydrocarbons and complexing agents. The fact that the complexing agent is dissolved in the solvent means that the capacity of the solvent for hydrocarbons will, in general, be reduced due to a salting-out effect. Since the affinity of solvent for aromatic hydrocarbons is greater than its affinity for other hydrocarbons, the solvent saturated with all components will reject more of the non-aromatics. Such an effect is known and used in the art to improve a solvent extraction; cf. German Ser. No. 1,275,038.

Feed streams which may be treated by the instant invention are those from which it is desired to separate aromatics. This would include aromatics having from 6 to 12 carbons and those having condensed rings such as anthracene and naphthalene. The aromatics would thus include benzene, toluene, the various xylene isomers such as ortho, meta and para, $C_7$ to $C_{12}$ alkyl derivatives of benzene in general, the polynuclear aromatics such as naphthalene, phenanthrene and alkyl or cycloalkyl derivatives of any of these. Typically, the aromatics to be removed by the instant invention would be found in hydrocarbon feed streams boiling between 120° and 1200° F. More specifically, the process of the instant invention would be used to remove aromatics from steam cracked naphthas which boil between 120° and 300° F. It is particularly important to remove aromatics such as benzene, toluene, and xylenes from naphthas because of their value as chemical raw materials. Other feed streams which may be treated by the instant invention include the following: light virgin naphthas, kerosenes, gas oils, and lube stocks. For instance, it may be advantageous to extract the aromatics from a light naphtha so as to reduce throughput to a reforming operation. In addition, the presence of a high concentration of aromatics within a kerosene range fraction such as a jet fuel, boiling generally between 275° and 625° F., is undesirable because of the unfavorable burning characteristics and lower energy content associated with aromatics. Aromatics within a lube oil fraction, boiling between 400° and 1200° F., are also undesirable because they cause poor oxidative stability and have an adverse effect on viscosity index.

The solvents to be utilized in the instant invention must have the following characteristics:

(1) An ability to promote the formation of separate layers, i.e., rejection of the raffinate as a separate liquid phase from solution and solid after the aromatics have been complexed and extracted.

(2) Solvent selectivity in the solutions described for aromatic hydrocarbons.

(3) At least some solvency for both inclusion forming substance and aromatics.

Additionally, the solvent should be non-reactive or only slightly reactive with the inclusion compound forming substance and should preferably promote complexing. The last factor is tied in with the ability of the solvent to dissolve inclusion compound forming substance and aromatic.

Particular solvents which may be utilized are polar solvents, preferably ether alcohols and polyols. Ether alcohols applicable to this invention may be represented by the generic formula:

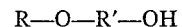

$$R-O-R'-OH$$

wherein R may be an alkyl or alkoxy radical and R' may be an alkylene radical. The major requirement is that the ether alcohol is liquid at operating temperatures, e.g., up to about 9 carbon atoms all totaled. Examples of such compounds are 2-methoxyethanol, 2-(2-ethoxyethoxy) ethanol and the like. The polyols applicable herein are preferably of a relatively low molecular weight and contain from about 2 to about 6 carbon atoms; e.g., diethylene glycol, ethylene glycol, glycerol, acetic acid esters of glycerol, e.g., monoacetin. Additionally, compounds such as furfuryl alcohol, n-methyl pyrrolidone, propylene carbonate, 1-piperazene ethanol, 2-chloroethanol, liquid phosphate esters such as tri-butyl phosphate, sulfolane, mixtures containing a minor proportion of ethylene glycol and a major proportion of 2-ethoxy ethanol, e.g., 25%/75%, and mixtures containing a major proportion of 2-methoxyethanol and a minor proportion of 2-ethoxy ethyl acetate, e.g., 75%/25%, can be used as solvents. A highly preferred solvent is 2-methoxy ethanol which readily promotes adduct and slurry formation.

With regard to the substance which forms an insoluble inclusion compound, the following requirements must be met:

(1) The complexing substance and the complex formed with aromatic molecules must preferentially associate, i.e., be wetted by the solvent phase rather than the hydrocarbon so that the complex will move with the slurry. Thus, hydrocarbon complexing agents such as triphenylmethane would not be suitable in the process of this invention.

(2) The aromatic complex must be stable in the presence of sufficient solvent to produce a pumpable slurry. Thus, the complexing agent Ni(4-methylpyridine)$_4$(SCN)$_2$ would be partially converted to a pyridine complex in the presence of excess pyridine; and its use as the 4-methylpyridine Werner complex in a pyridine slurry would be unlikely.

Particularly preferred Werner complexes are composed of a salt of a metal having an atomic number above 12 which is capable of forming complexes of the Werner type such as manganese, iron, cobalt and nickel. The anion of the Werner salt may comprise any suitable negative radical such as, for example, thiocyanate, isothiocyanate, azide, cyanate, isocyanate, cyanide, sulfate, nitrate, nitrite, chloride, bromide, iodide, phosphate, formate, acetate, and the like. The second component of the Werner complex is a base such as an amine, an aromatic amine, or a substituted pyridine which binds to the central metal atom of the Werner complex through coordinate bonds. Any nitrogen base which is sufficiently basic to form coordinate complexes with the Werner salts may be utilized, provided that selective complexing of aromatics can occur. This would include monocyclic and polycyclic compounds. Examples of suitable and preferred bases include pyridine, substituted pyridine and substituted pyrrols. Typical groups which may be used to substitute are halogen, hydroxy, nitro, alkoxy, aryloxy, amino, cyano, etc. These compounds would include the following:

TABLE 1

4-methylpyridine
4-ethylpyridine
4-n-propylpyridine
4-isopropylpyridine
4-n-butylpyridine
4-n-hexylpyridine
4-vinylpyridine
4-fluoropyridine
4-chloropyridine
4-bromopyridine
4-hydroxypyridine
4-hydroxymethylpyridine
4-methoxypyridine
4-aminopyridine
methylisonicotinate
4-cyanopyridine
4-acetylpyridine
4-chloromethylpyridine
3-methylpyridine
3-ethylpyridine
3-n-propylpyridine
3-isopropylpyridine
3-n-butylpyridine
3-vinylpyridine
3-chloropyridine
3-hydroxypyridine
3-methoxypyridine
3-acetylpyridine
3-cyanopyridine
ethyl nicotinate
3,4-dimethylpyridine
3,4-diethylpyridine
3-methyl,4-ethylpyridine
4-methyl,3-ethylpyridine
4-methyl,3-n-hexylpyridine
4-methyl,3-cyanopyridine
4-chloro,3-methylpyridine
4-acetyl,3-methylpyridine
4-methoxy,3-ethylpyridine
isoquinoline While, as indicated above, the Werner amines suitable for use in the preparation of Werner complexes within the scope of this invention are normally heterocyclic nitrogen bases, it is not essential that this be the case and other aromatic nitrogen bases known to form Werner complexes suitable for purposes of our invention can be used in lieu of said heterocyclic bases if desired. Particularly exemplary of nitrogen bases, other than heterocyclic bases, suitable for such purposes, are the substituted primary benzylamines having one or the other of the following general formulas:

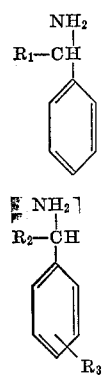

wherein $R_1$ is a primary alkyl group, $R_2$ is hydrogen or a primary alkyl group and $R_3$ is a neutral, relatively non-coordinating functional group such as alkyl, halogen, hydroxyl, nitro, alkoxy, aryloxy, cyano, carboalkoxy, and alkanoyl such as acetyl, which is compatible with any functional groups present in the mixture of compounds to be separated by the particular Werner complex under consideration; $R_3$ may be either polar or not and it can be located on the ortho, meta or para position of the benzene ring.

Other aromatic nitrogen bases which may be used in the instant invention have the following general formula:

TABLE 2

α-methylbenzylamine
α-ethylbenzylamine
α-propylbenzylamine
α-butylbenzylamine
α-isobutylbenzylamine
α-amylbenzylamine
α-hexylbenzylamine
α-octylbenzylamine
α-methyl-p-methylbenzylamine
α-methyl-o-methylbenzylamine
α-methyl-p-ethylbenzylamine
α-methyl-p-isopropylbenzylamine
α-methyl-p-t-butylbenzylamine
α-methyl-p-methoxybenzylamine
α-methyl-p-fluorobenzylamine
α-methyl-p-chlorobenzylamine
α-methyl-o-chlorobenzylamine
α-methyl-p-bromobenzylamine
α-methyl-p-iodobenzylamine
α-methyl-m-nitrobenzylamine
α-propyl-p-methylbenzylamine
α-propyl-p-bromobenzylamine
α-isobutyl-p-bromobenzylamine
α-methyl-p-cyclohexylbenzylamine
p-methylbenzylamine
p-bromobenzylamine
p-dimethylaminobenzylamine Many other similar examples of suitable Werner amines could be listed, as will be apparent to those skilled in the art, and the complexes may include only one such amine, or a mixture of two or more may be employed, in which case a mixed complex is formed.

The entire complex which is preferred has the following general formula:

$$AB_xC_y$$

wherein A is a metal atom as above defined, B is the Werner amine, C is the anion as above defined, $x$ is a number from 1 to 6, and $y$ is a number from 1 to 3. Examples of suitable complexes which may be employed are as follows:

[Ni(4MP)$_4$(SCN)$_2$]
[Cu(4MP)$_4$(SCN)$_2$]
[Hg(4MP)$_4$(NNN)$_2$]
[Co(pyridine)$_4$(OCN)$_2$]
[Cd(4MP)$_4$(CN)$_2$]
[Ag(4MP)$_2$(NNN)]
[Cr(pyridine)$_4$SO$_4$]
[Ti(isoquinoline)$_3$(NH$_3$)$_3$(C$_2$O$_4$)$_2$]
[Ni(4MP)$_4$Cl$_2$]
[Ni(4MP)$_4$(NNN)$_2$]
[Ni(4-n-propylpyridine)$_4$(SCN)$_2$]
[Ni(isoquinoline)$_4$Cl$_2$]
[Ni(4MP)$_4$Br$_2$]
[Mn(4MP)$_4$(SCN)$_2$]
[Mn(isoquinoline)$_4$(SCN)$_2$]
[Zn(4MP)$_4$Cl$_2$]
[NiNH$_3$(CN)$_2$]

The most preferred of the Werner complexes is nickel (4-methyl pyridine)$_4$(SCN)$_2$. Other disclosures which may be useful in describing Werner complexes are found in the book, "Clathrate Inclusion Compound," by Sister Martinette Hagan, published by the Rheinhold Press (1962) and "Modern Aspects of Inorganic Chemistry,"

Emeleus and Anderson, pp. 79–189, van Nostrand Company, 1946, both of which are herein incorporated by reference.

Reaction conditions for conducting the process contemplated herein will, of course, vary widely with the system utilized. Generally, however, there are no critical limitations and it is only necessary that the system be a liquid-liquid-solid (slurry) system, i.e., none of the constituents freeze and the complexing agent and adduct are stable. For example, typical temperatures may range from about −50° C. to about 180° C., preferably about −10° C. to about 100° C. Below −50° C. components may begin to solidify, solutions become more viscous, thereby inhibiting pumping and equilibrium solubilities are lowered. Above about 180° C., the adducts tend to become unstable. As temperatures decrease the stability of an adduct tends to increase.

Similarly, pressures are not critical and the processes may be conducted at subatmospheric pressures, e.g., 0.1 atmosphere, as well as superatmospheric pressure, e.g., 50 atmospheres. Atmospheric pressure is normally convenient for most processes. Reaction period will, of course, vary widely and is not critical. The duration of the contacting should be sufficient to establish an equilibrium in the system. In continuous countercurrent operations, the slurry mixture should equilibrate with the other liquid phase at each stage of the process. The nature of the contacting device is such as to provide several stages of equilibrium. Adduction periods for Werner complexes can normally range from 1 second to 15 minutes, preferably 1 second to 30 seconds, for a countercurrent operation without unreasonably large equipment.

The quantity of solvent employed is that quantity which will be sufficient to allow the formation of two liquid phases in the system and will generally range, on a volume basis, from about 1/10 to 10/1 in parts of solvent/parts of adducting substance, i.e., host. Typical ratios for Werner complexes with various solvents will range from 3/1 to 10/1.

The amount of complexing agent, i.e., Ni(4-methyl pyridine)$_4$(SCN)$_2$, ranges from about 1 to 3.5 parts of this Werner complex by weight per part of separable constituent, i.e., aromatic. Nevertheless, these amounts may vary upwardly or downwardly by the very nature of the complexation. One skilled in the art, after relatively little and routine experimentation, will be able to determine optimum weight ratios for any desired separation using any desired complexing substance.

The rate at which the hydrocarbon feed stream will be introduced into the contacting zone, the zone dimensions, and length to diameter ratio will depend on the size of the plant, the feed and product compositions, and the design of the contacting unit chosen for any particular separation. Consequently, typical residence times for a given drop of feed stream within the contacting zone will be from about a few seconds, i.e., 4 or 5, to 5 to 10 minutes, preferably 1 to 3 minutes. This may be compared quite favorably with batch adduction times in other complexing processes known to the art which are normally from about 30 minutes on upward and may extend to over 4 or 5 hours.

The contacting device may be any unit in which a multiplicity of equilibria may be reached such as a tower containing any suitable packing material, i.e., Raschig rings, or a sieve plate tower. In essence, the unit has somewhat the same function as a distillation column with many plates. Several equilibria are established during the course of the feed stream's passage through the column while countercurrently contacting the solvent-solid slurry.

Any adduct initially made is subject to equilibration with the whole range of compositions of hydrocarbon mixture from feed to final raffinate, and in washing section may indeed be equilibrated with pure product, so that the complexed guest may be as pure as desired, depending on the number of stages utilized. The raffinate leaving the unit will have been equilibrated with fresh slurry after having been repeatedly contacted over several equilibrium stages with ever-less saturated slurry. In this way, because of the extremely short residence times needed for this process, the maximum cleanup of raffinate and product purities may be obtained. After the slurry has been saturated with aromatics over the several stages of contacting with feed and product wash, the aromatic product may be removed readily by equilibrating the slurry with an excess of a substance or mixture which tends to dissolve the aromatics but which will not destroy the slurry. For example, n-pentane could be utilized. The stripping of products from slurry is in a sense the reverse of the extraction itself. Some heating of the slurry to aid in stripping off the more tightly adducted aromatics may prove beneficial. It is emphasized that the stripping process is also continuous and may be done over several equilibrium stages; without the short residence times the process of this invention provides, it would be impractical. The stripped slurry may be freed of stripping solvent by flash evaporation of the pentane on a continuous basis, after which it is pumped back to the extraction unit.

DESCRIPTION OF THE PREFERRED EMBODIMENTS

Example 1

In this example nickel (4-methyl pyridine)$_4$(SCN)$_2$ is used to form complexes with aromatic molecules. 50 grams of the nickel compound, 250 grams of propylene carbonate and 200 grams of a feed solution are contacted. The feed solution contains 30% by weight cyclohexane, 50% by weight normal heptane and 20% by weight of toluene. The contacting took place at 70° F. and atmospheric pressure. At the end of 15 minutes two liquid phases and a solid phase were observed. The organic distribution of the various phases, which was determined by gas-liquid chromatography, was as follows:

TABLE I

| Substance: | Raffinate (Top Layer), 162.2 g., percent | Solution, 27.7 g., percent | Solid complex, 9.0 g., percent |
|---|---|---|---|
| Cyclohexane | 31.6 | 20.1 | 9.5 |
| n-Heptane | 57.0 | 19.2 | 19.8 |
| Toluene | 11.6 | 62.0 | 70.8 |

Defining the separation factors, $\alpha$, by:

$$\alpha_1 = \frac{(\text{toluene/other}) \text{ in solution} + \text{solid}}{(\text{toluene/other}) \text{ in raffinate}}$$

$$\alpha_2 = \frac{(\text{toluene/other}) \text{ in solution}}{(\text{toluene/other}) \text{ in raffinate}}$$

and $$\alpha_3 = \frac{(\text{toluene/other}) \text{ in solid}}{(\text{toluene/other}) \text{ in raffinate}}$$

we have $$\alpha_1 = 10.3$$
$$\alpha_2 = 8.64$$
$$\alpha_3 = 18.7$$

Example 2

In order to compare the solvent extraction by solution of complex with that obtainable by merely using the solvent, under identical conditions, 250 grams of propylene carbonate was shaken with 200 grams of the same feed mixture used in Example 1. The following distribution of hydrocarbons resulted:

TABLE II

| Substance: | Oil, 178.2 g., percent | Extract, 21.7 g., percent |
|---|---|---|
| Cyclohexane | 32.3 | 19.8 |
| n-Heptane | 53.9 | 26.7 |
| Toluene | 13.7 | 53.5 |

A corresponding separation factor is $\alpha_2$, as defined above. Its value for solvent extraction is 7.3. This shows that not only was the slurry clathration more selective than the extraction alone, but that the solution part of the slurry was a better extractant than the same weight of complex-free solvent.

The relative capacities of the slurry clathration extraction, clathration alone, extraction alone and extraction with pure solvent are shown below:

TABLE III

| Process | Capacity | Selectivity, $\alpha$ |
|---|---|---|
| Slurry clathration | (1) | 10.3 |
| Clathration only | 4.5 | 18.7 |
| Extraction by solution | 14 | 8.64 |
| Extraction by solvent | 10.8 | 7.3 |

1 18% of feed extracted.

Slurry clathration, per stage, is less selective than clathration alone. This is certainly offset by the operational advantage of slurry processing, whereby more than one equilibrium stage can be utilized. The overall separation factor in a staged operation is the result of many equilibrations, and would be expected to be very high indeed.

Example 3

In this example, a hydrocarbon fraction boiling between 120° and 212° F. and containing 50 weight percent aromatics, which are to be recovered for the chemicals market, is processed and improved. The feed stream, a steam-cracked naphtha, has the following characteristics: benzene, 40.5 weight percent; toluene, 8.4 weight percent; $C_8$ aromatics, 0.6 weight percent. It is charged to a sieve tray tower at a rate of 1000 barrels per day. At the opposite end, or top of the tower, a slurry of Ni(4-methyl pyridine)$_4$(SCN)$_2$ and solvent which is propylene carbonate is charged at the rate of about 237 barrels per hour. The Werner complex makes up about 12.5% of the slurry by weight. Temperature in the tower is maintained at about 75° F. and pressure is ambient. Wash solvent, normal pentane, is run in at the bottom of the tower.

Feed stream depleted in aromatics is recovered from the top of the tower. This raffinate is analyzed by standard techniques; the aromatics content is found to be 2 weight percent, including benzene, toluene, and $C_8$ aromatics. The slurry effluent from the bottom of the tower is countercurrently contacted at 150° F. and a pressure of 4.5 atmospheres in a second tower, over 5 equilibrium stages, by a stream of n-pentane at the rate of 9900 barrels per day. The slurry effluent from this stripping tower is cooled to 75° F. and the n-pentane which separates from it is circulated to the extraction tower bottom. The slurry is recirculated to the top of the extraction unit. The hot n-pentane solution of aromatics product from the top of the stripping tower is flash distilled to remove n-pentane from the aromatics product, which is drawn off continuously at a rate of 495 barrels per day.

What is claimed is:

1. A process for the selective separation of aromatics from a feed stream which comprises: continuously contacting said feed stream with a slurry, said slurry comprising a solid capable of forming an insoluble inclusion compound with said aromatics and an inert liquid solvent which is substantially immiscible with said feed stream and also incapable of dissolving said solid but being capable of extracting said aromatics from said feed stream and promoting the formation of two liquid phases in equilibrium with said inclusion compound, one liquid phase comprising feed stream depleted in aromatics and the other liquid phase comprising the solvent associated with the inclusion compound as a slurry, said second phase being enriched in aromatics and recovering said first liquid phase and separately recovering said second liquid phase.

2. The process of claim 1 wherein said contacting is countercurrent.

3. The process of claim 2 wherein the substance capable of forming the inclusion compound is a Werner complex.

4. The process of claim 3 wherein the Werner complex is Ni(4-methyl pyridine)$_4$(SCN)$_2$.

5. The process of claim 2 wherein the solvent is selected from the group consisting of liquid ether alcohols and liquid polyols having about 2 to 12 carbon atoms.

6. The process of claim 2 wherein the Werner complex is NiNH$_3$(CN)$_2$.

7. The process of claim 2 wherein the solvent is 2-methoxy ethanol.

8. The process of claim 2 wherein the solvent is propylene carbonate.

9. The process of claim 2 wherein the aromatic has 6 to 12 carbons.

10. The process of claim 2 wherein the feed stream is a steam cracked naphtha.

11. The process of claim 2 wherein said solvent is a liquid phosphate ester.

12. A process for the selective separation of aromatics from a feed stream which comprises: continuously contacting said feed stream countercurrently, with a slurry, said slurry comprising a Werner complex capable of complexing with said aromatics and an inert liquid solvent, which is substantially immiscible with said feed stream and incapable of dissolving said Werner complex but being capable of extracting at least a portion of said aromatics from said feed stream and promoting the formation of two liquid phases in equilibrium with the Werner complex-aromatic inclusion compound, one liquid phase comprising feed stream depleted in aromatics and the other liquid phase comprising the solvent enriched in aromatics, associated with the inclusion compound as a slurry and recovering said first liquid phase and separately recovering said second liquid phase.

13. The process of claim 12 wherein said Werner complex has the formula:

$$AB_xC_y$$

wherein A is a metallic ion of atomic number greater than 11, B is a basic nitrogen, C is an anion, and $x$ and $y$ may vary independently from 1 to 6.

14. The process of claim 12 wherein said solvent is sulfolane.

15. The process of claim 12 wherein said solvent is dimethyl sulfoxide.

16. The process of claim 12 wherein said aromatic is a $C_6$ to $C_8$ aromatic.

17. The process of claim 12 wherein said aromatic is benzene.

18. The process of claim 12 wherein paraxylene is extracted from a mixture including at least one of the other xylene isomers.

References Cited

UNITED STATES PATENTS

| 2,774,802 | 12/1956 | Christian | 260—674 |
| 2,798,891 | 7/1957 | Schaeffer | 260—674 |
| 2,842,604 | 7/1958 | Waals et al. | 260—674 |
| 3,222,414 | 12/1965 | Shaeffer | 260—674 |

PAUL M. COUGHLAN, JR., Primary Examiner

C. E. SPRESSEN, JR., Assistant Examiner

U.S. Cl. X.R.

208—308